(12) United States Patent
Bahl et al.

(10) Patent No.: US 9,969,913 B2
(45) Date of Patent: May 15, 2018

(54) SEALING ELEMENT COMPOSITIONS HAVING BIORENEWABLE CONTENT

(71) Applicant: TEKNOR APEX COMPANY, Pawtucket, RI (US)

(72) Inventors: Kushal Bahl, Providence, RI (US); Kevin Cai, Cumberland, RI (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 245 days.

(21) Appl. No.: 14/678,222

(22) Filed: Apr. 3, 2015

(65) Prior Publication Data

US 2016/0115312 A1    Apr. 28, 2016

Related U.S. Application Data

(60) Provisional application No. 62/068,961, filed on Oct. 27, 2014.

(51) Int. Cl.
| | | |
|---|---|---|
| *C08K 5/10* | (2006.01) | |
| *C09J 153/02* | (2006.01) | |
| *C08L 53/02* | (2006.01) | |

(52) U.S. Cl.
CPC ............... *C09J 153/02* (2013.01); *C08K 5/10* (2013.01); *C08L 53/02* (2013.01)

(58) Field of Classification Search
CPC ........... C08K 5/10; C09J 153/02; C08L 53/02
See application file for complete search history.

(56) References Cited

U.S. PATENT DOCUMENTS

| | | | |
|---|---|---|---|
| 7,056,971 | B2 | 6/2006 | Varma |
| 7,960,007 | B2 | 6/2011 | Lee |
| 8,460,771 | B2 | 6/2013 | Lee |
| 8,552,117 | B1 | 10/2013 | Lee |
| 2002/0160137 | A1 | 10/2002 | Varma et al. |
| 2006/0229402 | A1 | 10/2006 | Varma et al. |
| 2007/0287779 | A1 | 12/2007 | Kimura et al. |
| 2009/0253818 | A1 | 10/2009 | Kimura et al. |
| 2010/0006532 | A1 | 1/2010 | Lee et al. |
| 2010/0249296 | A1 | 9/2010 | Kimura et al. |
| 2013/0090588 | A1 | 4/2013 | Buus et al. |
| 2014/0100310 | A1 | 4/2014 | Cai et al. |

FOREIGN PATENT DOCUMENTS

WO    0214171 A1    2/2002

OTHER PUBLICATIONS

Search Report dated Jan. 15, 2016.

*Primary Examiner* — Peter D. Mulcahy
(74) *Attorney, Agent, or Firm* — Hudak, Shunk & Farine Co., LPA

(57) ABSTRACT

Thermoplastic elastomer compositions, in particular derived from one or more styrenic block copolymers, a relatively high molecular weight isobutylene-containing (co)polymer, and a biorenewable processing aid. The isobutylene-containing (co)polymer imparts desirable oxygen barrier performance to the composition and the biorenewable processing aid acts as a barrier synergist as well as a processing aid useful during compounding. Low oxygen permeability sealing elements can be formed from the compositions. Processes for preparing the compositions and sealing elements are disclosed.

21 Claims, 2 Drawing Sheets

SEALING ELEMENT COMPOSITIONS HAVING BIORENEWABLE CONTENT

CROSS REFERENCE

This application claims the benefit of U.S. Provisional Application 62/068,961 filed Oct. 27, 2014 entitled SEALING ELEMENT COMPOSITIONS HAVING BIORENEWABLE CONTENT, which is hereby fully incorporated by reference.

FIELD OF THE INVENTION

The present invention relates to thermoplastic elastomer compositions, in particular derived from one or more styrenic block copolymers, a relatively high molecular weight isobutylene-containing (co)polymer, and a biorenewable processing aid. The isobutylene-containing (co)polymer imparts desirable oxygen barrier performance to the composition and the biorenewable processing aid acts as a barrier synergist as well as a processing aid useful during compounding. Low oxygen permeability sealing elements can be formed from the compositions. Processes for preparing the compositions and sealing elements are disclosed.

BACKGROUND OF THE INVENTION

Various sealing elements, for example in the form of a single layer or liner, are utilized to maintain the integrity of a container such as for liquid or dry food stuff applications, medical products, and nutritional products. Single layer sealing elements can be formed by extruding a polymer composition, cutting and placing a quantity of the extrudate at a desired location such as in the center of a cap, followed by compression molding the extrudate into a gasket or liner. In other embodiments, injection molding can be utilized to produce a sealing element in the form of a seal ring, for example in a cap.

Properties required of the sealing elements can vary depending upon individual applications. In some embodiments, sealing elements are required to maintain a suitable oxygen barrier for a desired lifespan of the product and also be easily removable from the container when desired by a consumer or other user. The sealing elements also should provide adequate sealing at a wide range of temperatures. Some sealing elements must be resistant to acids or bases. Further, sealing elements whether designed for a single use or a multiple use item, should retain their integrity and not shred or tear in order to prevent contamination of the packaged products.

International publication WO 02/141171 relates to a liner with reportedly improved oxygen barrier properties for use with closure cap shells. The liners are made of a composition that includes a thermoplastic elastomer, polyisobutylene and polybutylene. The publication further states that oil-based plasticizers, such as mineral oil have been included in liner compositions to improve the processability of the composition. However, under certain conditions, extractable compounds from the mineral oil have been known to migrate from the liner composition to the stored food product, according to the publication. Plasticizers such as mineral oil have also been known to exhibit an odor and/or affect the taste of the food product. Further, it is stated that it would be desirable to provide a liner that is easy to process but (1) does not include an oil or other plasticizer, (2) does not affect the taste of the stored food product, and (3) is substantially odorless.

U.S. Pat. No. 7,056,971 relates to a thermoplastic elastomer which is oxygen-permeable that is provided with reportedly excellent barrier properties against oxygen by melt-blending with a liquid polyisobutene oil plasticizer in an amount insufficient to render the plasticized elastomer tacky. It is further stated that polybutene, whether homo- or copolymers of isobutene, 1-butene (α-butylene) and/or 2-butene (β-butylene, whether cis- or trans-) irrespective of the ratio of the repeating units, and polymers of higher alkenes having from 5 to about 8 carbon atoms ("poly(higher)alkenes"), are typically rubbery solids. But such rubbers, it is stated, by themselves have unsatisfactorily high oxygen-permeation rates. Since a thin seal of an adequately deformable block copolymer, formed of S-blocks and a M-block of a conjugated diene, or, of a mono(lower)olefin, and no harder than Shore A 90, provides an unsatisfactorily high oxygen-permeation rate, it is reportedly not surprising that a rubbery poly(higher)alkene would also provide a comparably unsatisfactory oxygen-permeation rate.

A problem still exists as thermoplastic elastomer sealing elements are needed which have desirable barrier properties, that are readily processable under desired conditions, also do not contribute to one or more of taste and odor of the packaged product, and which are especially useful in foodstuff applications. Silicone oil, although it is effective in reducing removal torque, can cause reduced barrier performance and bondability to cap substrate. Fatty amides suitable for reducing tackiness have unsaturation, which is prone to oxidation/degradation and formation of odorous chemicals. When fatty amides are used in more than 10-20 phr, the composition is not suitable for food contact application due to sensory problems. When relatively high MW polyisobutylene is used, the compounds with fatty amides or silicone oil as lubricant are also difficult to process due to increase melt viscosity.

SUMMARY OF THE INVENTION

In view of the above, it is an object of the present invention to provide thermoplastic elastomer sealing element compositions that exhibit desirable barrier properties.

Another object of the present invention is to provide sealing element compositions including biorenewable materials that serve as processing aids and barrier synergists when combined with the isobutylene-containing (co)polymer or butyl rubber utilized in the compositions of the invention. The term "(co)polymer" when utilized herein refers to either a homopolymer or a copolymer comprising two or more different monomers.

Still another object of the present invention is to provide compositions comprising a biorenewable processing aid that is solid at room temperature and has a crystalline melting range of 30-80° C. Melting range is tested by heating sample at fixed rate from −50° C. to 160° C. using a DSC.

Another object of the present invention is to utilize biorenewable processing aids that are hydrogenated, which serve to increase the stability thereof.

When the biorenewable processing aid is added at more than 3%, it also acts as an elastic shape memory fixant, which will allow styrenic block copolymer to be stretched at processing temperature (above melting point) and fix the styrenic block copolymer shape memory when it is cooled to room temperature or below its melting point. Such elastic memory shape further aids with sealing performance in cap liner applications, especially in those require retort or pasteurization at elevated temperature.

Accordingly, in one aspect, a sealing element composition is disclosed, comprising a styrenic block copolymer, a biorenewable processing aid comprising a natural ester, an isobutylene-containing (co)polymer or butyl rubber having a number average molecular weight greater than 6,000 g/mol, and a polyolefin. Sealing elements comprising the composition are also disclosed.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other independent embodiments.

Figure 4:
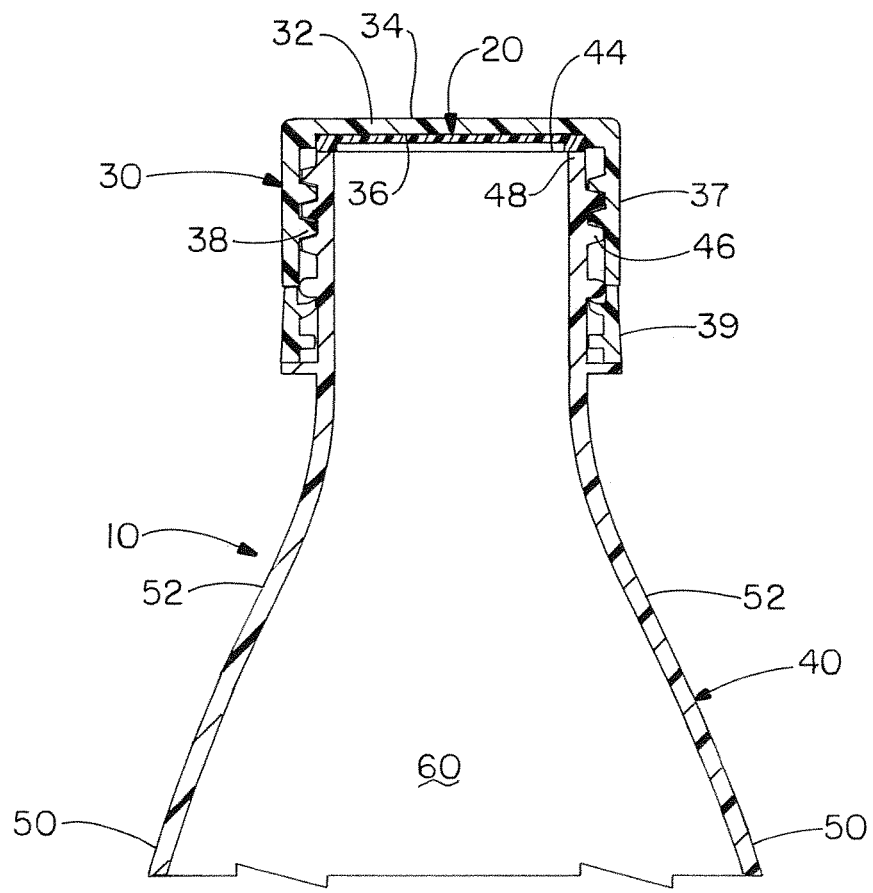
Figure 1:
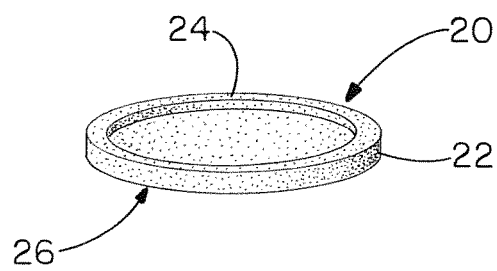
FIG. 1 is a perspective view of one embodiment of a sealing element formed as a liner pad having a relatively thick rim portion.
Figure 2:
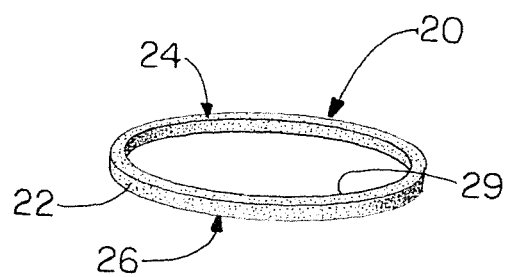
FIG. 2 is a perspective view of one embodiment of a sealing element formed as a sealing ring having a hollow center.
Figure 3:
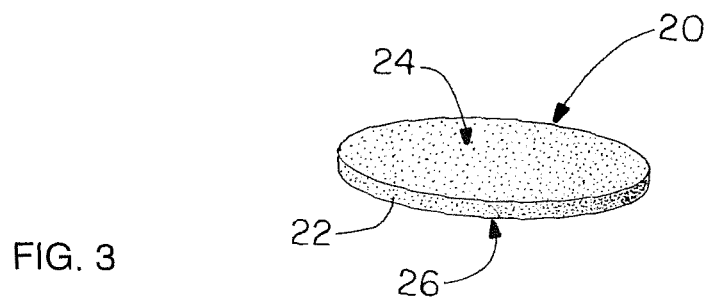
FIG. 3 is a perspective view of one embodiment of a sealing element formed as a liner pad having a substantial constant thickness; and, FIG. 4 is a cross-sectional side elevational view schematically illustrating one embodiment of a container sealed with a sealing element of the present invention that is located inside a closure of the container.

Referring now to the drawings, one embodiment of a container 10 with a sealing element 20 is shown in FIG. 4 and various sealing elements are shown in FIGS. 1-3. The container 10 has a body 40 that is adapted to be filled with a beverage, foodstuff, or another desired item, and sealed with a closure 30, wherein a sealing element 20 is provided to seal an opening 44 in the container body 40. Preferably, the sealing element 20 is situated between the closure 30 and the opening 44 in the container body 40 in one embodiment, when the closure 30 is connected to the body 40.

The closure 30 of the container 10 is generally a cap or lid which, in a preferred embodiment, is adapted to have the liner adhered to a surface thereof, with or without the use of one or more adhesives. The closure 30 illustrated in FIG. 4 includes a generally annular or circular top portion 32 having an upper surface 34 and a lower surface 36, with the sealing element 20 being in contact with at least a portion of the lower surface 36. The closure 30 has a substantially cylindrical skirt 37 extending downwardly from the top portion and integrally formed therewith. The skirt includes an interior surface and an exterior surface, with the exterior surface being provided with ribs, protrusions or indentations in one embodiment which can aid in sealing the closure 30 to the container 10. In one embodiment, a thread 38 is formed in the inner wall of the skirt that mates with a thread 46 formed on the outer wall of the neck portion of the container body 40 shown in FIG. 4. Although threads are shown in the drawings and utilized in one preferred embodiment, those of ordinary skill in the art will recognize that other methods of securing the closure 30 and sealing element 20 contained therein to the container body 40 may also be utilized, such as a snap-on configuration. The thread 46 may have one of a variety of thread configurations, such as a single helix, double helix, triple helix, or other multiple helixes, as are known in the art.

While one type of closure is shown in FIG. 4 to illustrate a suitable use or application of the sealing elements of the invention, the closure can be formed as known to those of ordinary skill in the art. That said, the sealing element can be utilized as a gasket for metal and plastic closure applications including, but not limited to, beverage cap liners, hot fill juice cap liners, polypropylene cap liners, steel or aluminum cap liners, high density polyethylene cap liners, window glass gaskets, sealed containers, closure caps, gaskets for medical devices, filter elements, pressure venting gaskets, hot melt gaskets, twist-off caps, press-on twist-off caps, electrochemical cell gaskets, refrigerator gaskets, galvanic cell gaskets, leak proof cell gaskets, waterproofing sheet, reusable gaskets, synthetic cork-like materials, thin cell electromembrane separator, magnetic rubber materials, disc gaskets for alcoholic beverage bottle caps, freeze resistant seal rings, gaskets for plastic castings, expansion joints and waterstops, corrosion-resistant conduit connectors, flexible magnetic plastics, pipe joint seals, integral weatherproof plastic lid and hinge for electrical outlets, magnetic faced foamed articles, jar rings, flexible gaskets, glass seals, tamper evident sealing liners, pressure applicators, combined bottle cap and straw structures, large condiment bottle liners, metal caps for applesauce or salsa jars, home canning jars, twist crowns, crowns, and the like.

In one embodiment of the present invention, a tamper evident band 39 may be formed on the lower portion of the skirt and may include ratchet teeth that engage mating ratchet teeth formed in the neck of the container.

The sealing element 20 in one embodiment has a lower surface 26 adapted to contact a portion of the container body 40 and an upper surface 24 that abuts the top interior lower surface 36 of the closure and is sized to fit firmly within the closure. In one embodiment such as shown in FIG. 1, the diameter or peripheral edge 22 of the sealing element is large enough that the sealing element 20 can be held within the cap without the need for a bonding material. In other embodiments, the sealing element may be optionally adhered, if desired, such as on its upper surface 24, to the closure by a variety of means such as known in the art, for example a thin layer of adhesive, glue or similar bonding material. The composition of the sealing element should be sufficient that the material be pliable or elastic and can be compressed between the closure and the container, but also sufficiently resilient so that the material can recover from a compressed state at ambient temperature and pressure conditions as well as under stress temperature in pressure conditions, such as are present during a retort process. The sealing element should have sufficient elasticity so it can conform to any distortions in the container body, such as at the container lip 48, for example molding nubs or small divots or voids, or distortions in the closure.

In some embodiments, the sealing element is a liner pad formed in the shape of a planar seal ring, and generally formed with a thickened rim 28 which is shown in FIG. 1. The central area of the sealing element has a thickness which is less than a thickness of rim 28. In the embodiment illustrated in FIG. 2, the sealing element is in the form of a seal ring having an aperture or a hollow central area which is bounded by an inner edge 29 of the sealing element 20.

The sealing element 20 illustrated in FIG. 3 is a liner pad in the form of a seal ring that has a substantially constant thickness between upper surface 24 and lower surface 26. While the sealing elements illustrated in FIGS. 1-3 are illustrated as circular, it is important to understand that the form thereof is not limited thereto and the sealing elements can be formed in generally any imaginable shape and size as desired by the end user.

The container body 40 comprises a base (not shown) and outer side walls 50 extending upwardly from the base. The base and outer side walls define a void 60 in the body portion of the container for receiving one or more products such as described herein. In one embodiment, the outer side walls form shoulders 52 at an upper end which lead to a neck portion that terminates in an opening, defining lip 48 having a periphery. As shown in FIG. 4, the neck has an exterior portion adapted to allow the container body to receive and engage the closure 30. The configuration of the container body 40 illustrated in FIG. 4 is generally a bottle. It should be understood that containers useful in the prevent invention can be made in a variety of other configurations suitable for a particular application.

In some embodiments of the invention, it is desired that the sealing elements formed are able to withstand a heat treatment process such as sterilization or heat treatment utilizing a retort process or a hot fill process. For the sake of clarity, it is to be understood that the sealing elements can also be used in processes that are performed generally at room temperature or even below room temperature.

The sealing element compositions of the present invention suitable for forming a sealing element or other object or article include one or more styrenic block copolymers, one or more polyolefins, one or more biorenewable processing aids and one or more isobutylene-containing (co)polymer, preferably having a number average molecular weight of greater than 6,000 g/mol. In various embodiments, one or more additional components are present in the compositions, for example antioxidants, stabilizers such as UV stabilizers, lubricants, softeners, friction modifying agents, oxygen scavenger, and other additives.

Styrenic Block Copolymers

In various embodiments, the compositions of the present invention include one or more styrenic block copolymers. In a preferred embodiment, the styrenic block copolymers have a hard block (A) including aromatic vinyl or mono alkenyl arene repeat units and at least one soft polymer block (B) containing two or more repeat units, that are the same or different, and independently derived from olefin monomers. The styrenic block copolymer can be, for example, a triblock copolymer (A-B-A); or a tetrablock or higher multiblock copolymer. In a preferred embodiment, the styrenic block copolymer is a triblock copolymer (A-B-A) having two hard blocks.

The number average molecular weight and distribution of any type of styrenic block copolymer (SBC) described in this application are measured by gel permeation chromatography (GPC). The SBC is dissolved in a suitable solvent, such as THF, (typically 0.001-0.010 wt. %), and an appropriate quantity is injected into a GPC device. One suitable GPC device is available from Waters of Milford, Mass. as a Waters Breeze Dual Pump LC. The GPC analysis is performed at an appropriate elution rate (1 to 10 mL/min). The molecular weight distribution is characterized by the signals from UV and refractive index detectors, and number average molecular weights are calculated using a calibration curve generated from a series of narrow molecular weight distribution polystyrenes with peak molecular weights of 500 to 1,000,000 as standard.

Each hard polymer block (A) can have two or more same or different aromatic vinyl repeat units. For example, the block copolymer may contain (A) blocks which are styrene/alpha-methylstyrene copolymer blocks or styrene/butadiene random or tapered copolymer blocks so long as a majority of the repeat units of each hard block are aromatic vinyl repeat units. The (A) blocks are aromatic vinyl compound homopolymer blocks in one embodiment. The term "aromatic vinyl" is to include those of the benzene series, such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other mono alkenyl polycyclic aromatic compounds such as vinyl naphthalene, vinyl anthracene and the like. The preferred aromatic vinyl compounds are monovinyl monocyclic aromatics, such as styrene and alpha-methylstyrene, with styrene being most preferred. When three or more different repeat units are present in hard polymer block (A), the units can be combined in any form, such as random form, block form and tapered form.

Optionally, the hard polymer block (A) can comprise small amounts of structural units derived from other copolymerizable monomers in addition to the structural units derived from the aromatic vinyl compounds. The proportion of the structural units derived from other copolymerizable monomers is desirably 30% by weight or less and preferably 10% by weight or less based on the total weight of the hard polymer block (A). Examples of other copolymerizable monomers include, but are not limited to, 1-butene, pentene, hexene, conjugated dienes such as butadiene or isoprene, methyl vinyl ether, and other monomers.

The soft polymer block (B) of the styrenic block copolymer includes two or more same or different structural units. Soft polymer block (B) can be derived from olefin monomers generally having from 2 to about 12 carbon atoms and can include, for example, ethylene, propylene, butylene, isobutylene, etc. When the soft polymer block (B) has structural units derived from three or more repeat units, the structural units may be combined in any form such as random, tapered, block or any combination thereof. In one embodiment, the soft polymer block does not contain any unsaturated bonds.

In additional embodiments of the present invention, the styrenic block copolymer can have at least one soft polymer block (B) including two or more repeat units that are the same or different, independently derived from one or more of an olefin monomer and a diene monomer. When the diene monomer is present, the styrenic block copolymer is preferably hydrogenated or substantially hydrogenated. The conjugated diene monomers preferably contain from 4 to about 8 carbon atoms with examples including, but not limited to, 1,3-butadiene (butadiene), 2-methyl-1,3-butadiene (isoprene), 2,3-dimethyl-1,3-butadiene, 1,3-pentadiene (piperylene), 1,3-hexadiene, and the like. Therefore, in one embodiment, the soft polymer block (B) can have structural units derived from one or more of an olefin monomer(s) and diene monomer(s). As indicated hereinabove, when the soft polymer block (B) has structural units derived from three or more repeat units, the structural units may be combined in any form.

The styrenic block copolymers may be prepared utilizing bulk, solution or emulsion or other techniques as known in the art.

Optionally, the soft polymer block (B) can include small amounts of structural units derived from other copolymerizable monomers in addition to the structural units described. In this case, the proportion of the other copolymerizable monomers is generally 30% by weight or less, and preferably 10% by weight or less based on the total weight of the soft polymer block (B) of the styrenic block copolymer. Examples of other copolymerizable monomers include, for example, styrene, p-methylstyrene, α-methylstyrene, and other monomers that can undergo ionic polymerization. Non-limiting examples of styrenic block copolymers having structural units derived from other copolymerizable monomers include controlled distribution block styrenic block copolymers and styrenic block copolymers having a random distribution mid-block including styrenic monomers.

Optionally, the styrenic block copolymer can be a functionalized styrenic block copolymer such as an acid or anhydride functionalized block copolymer, such as prepared by graft reacting an acid moiety or its derivative into the styrenic block copolymer via a free radically initiated reaction. Examples of suitable monomers which may be grafted include unsaturated mono and polycarboxylic acids and anhydrides containing from about 3 to about 10 carbon atoms. Examples of such monomers are fumaric acid, itaconic acid, citraconic acid, acrylic acid, maleic anhydride, itaconic anhydride, and citraconic anhydride, or the like. Suitable functionalized styrenic block copolymers generally contain from about 0.1 to about 10 percent by weight, preferably from about 0.2 to about 5 percent by weight of the grafted monomer, based on the total weight of the styrenic block copolymer. Grafting reactions can be carried out in solution or by melt mixing the base block copolymer and the acid/anhydride monomer in the presence of a free radical initiator, such as known in the art, see for example U.S. Pat. No. 6,653,408, herein fully incorporated by reference. Suitable functionalized block copolymers are available from KRATON Polymers, Kuraray, Asahi-Kasei, BASF and the like.

In various embodiments, the styrenic block copolymers include, but are not limited to, styrene-butadiene-styrene (SBS), styrene-butadiene/butylene-styrene (SBBS), styrene-isoprene-styrene (SIS), styrene-ethylene/propylene-styrene (SEPS), styrene-ethylene/propylene (SEP), styrene-ethylene/butylene-styrene (SEBS), styrene-ethylene/ethylene/propylene-styrene (SEEPS) and styrene-isobutylene-styrene (SIBS).

Styrenic block copolymers are available in the art from sources such as Kraton Polymers of Houston, Tex., as Kraton; Kuraray Co., Ltd. of Tokyo, Japan as SEPTON™ styrenic block copolymers, LCY Chemical Industry Corp, as Globalprene®, and TSRC Corporation of Taiwan as Taipol.

Polyolefins

The compositions of the present invention include one or more polyolefins, which as utilized herein are defined as one or more of a polyolefin polymer and a polyolefin copolymer unless otherwise indicated. Polyolefins suitable for use in the compositions of the present invention comprise amorphous or crystalline homopolymers or copolymers of two or more same or different monomers derived from alpha-monoolefins having from 2 to about 12 carbon atoms, and preferably from 2 to about 8 carbon atoms. Examples of suitable olefins include ethylene, propylene, 1-butene, 1-pentene, 1-hexene, 2-methyl-1-propene, 3-methyl-1-pentene, 4-methyl-1-pentene, 5-methyl-1-hexene, and combinations thereof. Polyolefins include, but are not limited to, low-density polyethylene, high-density polyethylene, linear-low-density polyethylene, polypropylene (isotactic and syndiotactic), ethylene/propylene copolymers, and polybutene.

Polyolefin copolymers can also include the greater part by weight of one or more olefin monomers and a lesser amount of one or more non-olefin monomers such as vinyl monomers including vinyl acetate, or a diene monomer, etc. Polar polyolefin polymers include ethylene acrylate and ethylene vinyl acetate, for example. In a preferred embodiment, EVA is utilized that has a vinyl acetate content of greater than 5 percent. Generally, a polyolefin copolymer includes less than 40 weight percent of a non-olefin monomer, desirably less than 30 weight percent, and preferably less than about 10 weight percent of a non-olefin monomer.

In a further embodiment, the polyolefin can include at least one functional group per chain or can be a blend of non-functionalized polyolefins and functionalized polyolefins. Functional groups can be incorporated into the polyolefin by the inclusion of for example, one or more non-olefin monomers during polymerization of the polyolefin. Examples of functional groups include, but are not limited to, anhydride groups such as maleic anhydride, itaconic anhydride and citraconic anhydride; acrylates such as glycidyl methacrylate; acid groups such as fumaric acid, itaconic acid, citraconic acid and acrylic acid; epoxy functional groups; and amine functional groups. Functional group-containing polyolefins and methods for forming the same are well known to those of ordinary skill in the art. Functionalized polyolefins are available commercially from sources such as Uniroyal, Atofina, and DuPont. Epoxy modified polyethylenes are available from Atofina as LOTADER®. Acid modified polyethylenes are available from DuPont as FUSABOND®.

Polyolefin polymers and copolymers are commercially available from sources including, but not limited to, Chevron, Dow Chemical, DuPont, ExxonMobil, Huntsman Polymers, Ticona and Westlake Polymer under various designations.

The polyolefins range in an amount generally from about 0 or about 1 to about 200 parts, desirably from about 10 to about 170 parts, and preferably from about 20 to about 150 parts by weight based on 100 parts by weight of total styrenic block copolymer.

Biorenewable Processing Aid

The compositions of the present invention include at least one biorenewable processing aid, preferably an ester group-containing oil, such as a monoester, diester or triester. As defined in the art, an ester comprises the formula R—COO—R$^1$, wherein R is hydrogen or a hydrocarbyl and R$^1$ is a hydrocarbyl, e.g. an alkyl, aryl, or alkyl aryl, each optionally substituted. In one preferred embodiment the biorenewable processing aid is hydrogenated. Iodine value of 50 cg/g or less, preferably less than 20 cg/g, and most preferably less than 5 cg/g measured according to ASTM D5768. Hydrogenation of the double bonds of processing aids, such as soybean oil, has been found to increase the stability thereof significantly. In one embodiment, the biorenewable processing aid is a solid at room temperature, i.e. 23° C. In a further embodiment the biorenewable processing aid has a crystalline melting range of about 30 to about 80° C.

Styrenic block copolymers in some embodiments have a relatively high inherent oxygen permeability. In order to increase barrier performance the isobutylene-containing (co) polymer is added thereto. One disadvantage of adding isobutylene-containing (co)polymer to TPE is that it increases the viscosity of the composition significantly and can make the composition difficult to process. Conventional processing aids such as mineral oil, silicone oil or paraffin oil may be added to the compound to improve processability.

However, one disadvantage of using such processing aids is that they can decrease the barrier performance of the composition. Thus, plasticization comes at a cost of increased permeability which is undesirable. It has been discovered that the biorenewable processing aid not only reduces viscosity of the composition, but also acts as a barrier synergist with the isobutylene-containing (co)polymer and reduce the oxygen permeability of a sealing element or other article formed from the composition. In addition, due to its polar nature and relatively low molecular weight, the biorenewable processing aid may also serves as a lubricant to lower the coefficient of friction of the compound against both polar and non-polar surfaces such as glass and polyolefins, respectively.

Furthermore, as mentioned above, the biorenewable processing aid when utilized in relatively high amounts, generally greater than 2 or 3 percent or greater than 5 percent based on the total weight of the styrenic block copolymer, additionally serves as an elastic shape memory fixant when the sealing element is at room temperature.

In one preferred embodiment, the biorenewable processing aid component comprises a glyceride or acylglycerol, i.e. a monoglyceride, diglyceride, triglyceride, or combination thereof. Many naturally occurring fats and oils are the fatty acid esters of glycerol. Triglycerides are preferred in one embodiment. The glycerides can be saturated or unsaturated or a combination thereof.

One or more esters can be employed in the present invention. In a preferred embodiment at least one ester utilized is biorenewable. Suitable esters that can be employed in the present invention include those of the following formulas:

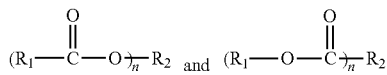

where n has any value from 1 to about 8, and $R_1$ and $R_2$ are the same or different and are hydrogen or a hydrocarbyl (including substituted hydrocarbyls) provided the ester is compatible in the compositions of the invention. It is noted that a suitable group for $R_2$ depends on the value of n.

In one embodiment of the present invention, n is 1, and the ester has the formula $R_1C(O)OR_2$ where $R_1$ is a $C_{10}$-$C_{22}$, preferably a $C_{15}$-$C_{22}$, alkyl, and $R_2$ is a lower alkyl radical containing from 1 to 22 carbon atoms.

Another class of suitable esters that may be employed in the present invention is represented by the following formula:

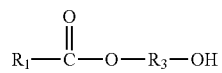

where $R_1$ is defined above and $R_3$ includes alkylene or substituted alkylene.

Still another class of suitable esters that may be employed in the present invention is represented by the following formula:

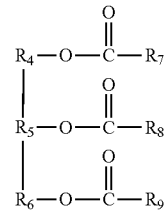

where $R_4$, $R_5$, and $R_6$, independently, include alkylene or substituted alkylene; and $R_7$, $R_8$, and $R_9$ individually include hydrogen or a hydrocarbyl.

Suitable esters are described in U.S. Patent Application Publication No. 2014/0100310, herein fully incorporated by reference.

In a preferred embodiment, the ester oils are natural product oils that are typically found in animal or plant tissues, including those which have been hydrogenated to eliminate or reduce unsaturation. These natural product oils that can be employed in the present invention include compounds that have the following formula:

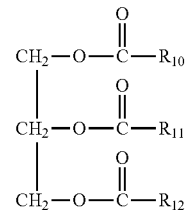

where $R_{10}$ $R_{11}$ and $R_{12}$, independently, may be the same or different fatty acid radicals containing from 8 to 22 carbon atoms.

Suitable biorenewable processing aid natural product oils of the above formula that can be employed in the present invention include, but are not limited to: Kernel Oil; Argania Spinosa Oil; Argemone Mexicana Oil; Avocado (*Persea Gratissima*) Oil; Babassu (*Orbignya Olelfera*) Oil; Balm Mint (*Melissa Officinalis*) Seed Oil; Bitter Almond (*Prunus Amygdalus Amara*) Oil; Bitter Cherry (*Prunus Cerasus*) Oil; Black Currant (*Ribes* Nigrrrm) Oil; Borage (*Borago Officinalis*) Seed Oil; Brazil (*Bertholletia Excelsa*) Nut Oil; Burdock (*Arctium Lappa*) Seed Oil; Butter; $C_{12-18}$ Acid Triglyceride; Calophyllurn Tacamahaca Oil; *Camellia* Kissi Oil; *Camellia* Oleifera Seed Oil; Canola Oil; Caprylic/Capric/Liuric Triglyceride; Caprylic/Capric/Linoleic Triglyceride; Caprylic/Capric/Myristic/Stearic Triglyceride; Caprylic/Capric/Stearic Triglyceride; Caprylic/Capric Triglyceride; Caraway (*Canimn Carvi*) Seed Oil; Carrot (*Daucus Carota Sativa*) Oil; Cashew (*Anacardium Occidentale*) Nut Oil; Castor (*Ricinus Communis*) Oil; Cephalins; Chaulmoogra (*Taraktogenos Kurzii*) Oil, Chia (*Salvia Hispanica*) Oil; Cocoa (Theobrama Cacao) Butter; Coconut (*Cocos Nucifera*) Oil; Cod Liver Oil; Coffee (*Coffea Arabica*) Oil; Corn (*Zea Mays*) Germ Oil; Corn (*Zea Mays*) Oil; Cottonseed (*Gossypium*) Oil; $C_{10-18}$ Triglycerides; Cucumber (*Cucumis Sativus*) Oil; Dog Rose (*Rosa Canina*) Hips Oil; Egg Oil; Emu Oil; Evening Primrose (*Oenothera Biennis*) Oil; Fish Liver Oil; *Gevuina Avellana* Oil; Glyceryl Triacetyl Hydroxystearate; Glyceryl Triacetyl Ricinoleate; Glycolipids; Glycosphingolipids; Goat Butter; Grape (*Vitis Vinifera*) Seed Oil; Hazel (*Croylus Americana*) Nut Oil; Hazel (*Corylus Aveilana*) Nut Oil; Human Placental Lipids; Hybrid Safflower (*Ceathamus Tinctorius*) Oil; Hybrid Sunflower (*Helianthus Annuus*) Seed Oil; Hydrogenated Canola Oil; Hydrogenated Castor Oil; Hydrogenated Castor Oil Laurate; Hydrogenated Castor Oil Triisostearate; Hydrogenated Coconut Oil; Hydrogenated Cottonseed Oil; Hydrogenated $C_{12-18}$ Triglycerides; Hydrogenated Fish Oil; Hydrogenated Lard; Hydrogenated Menhaden Oil; Hydrogenated Milk Lipids; Hydrogenated Mink Oil; Hydrogenated Olive Oil; Hydrogenated Orange Roughy Oil; Hydrogenated Palm Kernel Oil; Hydrogenated Palm Oil; Hydrogenated Peanut Oil; Hydrogenated Rapeseed Oil; Hydrogenated Shark Liver Oil; Hydrogenated Soybean Oil; Hydrogenated Tallow; Hydrogenated Vegetable Oil; *Isatis Tinctoria* Oil; Job's Tears (*Coix Lacryma-Jobi*) Oil; Jojoba Oil; Kiwi (*Actinidia Chinensis*) Seed Oil; Kukui (*Aleurites Moluccana*) Nut Oil; Lard; Lauric/Palmitic/Oleic Triglyceride; Linseed (*Linum Usitatissiumum*) Oil; Lupin (*Lupinus Albus*) Oil; Macadamia Nut Oil; Macadamia *Ternifolia* Seed Oil; Macadamia *Integrifolia* Seed Oil; Maleated Soybean Oil; Mango (*Mangifera Indica*) Seed Oil; Marmot Oil; Meadowfoam (Limnanthes fragraAlba) Seed Oil; Menhaden Oil; Milk Lipids; Mink Oil; Moringa Pterygosperma Oil; *Mortierella* Oil; Musk Rose (*Rosa Moschata*) Seed Oil; Neatsfoot Oil; Neem (*Melia Azadirachta*) Seed Oil; Oat (*Avena Sativa*) Kernel Oil; Oleic/Linoleic Triglyceride; Oleic/Palmitic/Lauric/Myristic/L-inoleic Triglyceride; Oleostearine; Olive (*Olea Europaea*) Husk Oil; Olive (*Olea Europaea*) Oil; Omental Lipdis; Orange Roughy Oil; Ostrich Oil; Oxidized Corn Oil; Palm (*Elaeis Guineensis*) Kernel Oil; Palm (*Elaeis Guineensis*) Oil; Passionflower (*Passiflora Edulis*) Oil; Peach (*Prunus Persica*) Kernel Oil; Peanut (*Arachis Hypogaea*) Oil; Pecan (Caiya Illinoensis) Oil; Pengawar Djambi (Cibotium Barometz) Oil; Phospholipids; Pistachio (*Pistacia Vera*) Nut Oil; Placental Lipids; Poppy (*Papaver Orientale*) Oil; Pumpkin (*Cucurbita Pepo*) Seed Oil; Quinoa (*Chenopodium Quinoa*) Oil; Rapeseed (*Brassica Campestris*) Oil; Rice (*Oryza Sativa*) Bran Oil; Rice (*Oryza Sativa*) Germ Oil; Safflower (*Carthamus Tinctorius*) Oil; Salmon Oil; Sandalwood (*Santalum Album*) Seed Oil; Seabuchthom (*Hippophae Rhamnoides*) Oil; Sesame (*Sesamum Indicum*) Oil; Shark Liver Oil; Shea Butter (*Butyrospermum Parkii*); Silk Worm Lipids; Skin Lipids; Soybean (*Glycine Soja*) Oil; Soybean Lipid; Sphingolipids; Sunflower (*Helianthus Annuus*) Seed Oil; Sweet Almond (*Prunus* Amygdalus *Dulcis*) Oil; Sweet Cherry (*Prunus Avium*) Pit Oil; Tali Oil; Tallow; Tea Tree (*Melaleuca Altemifolia*) Oil; Telphairia *Pedata* Oil; Tomato (*Solanum Lycopersicum*) Oil; Triarachidin; Tiibehenin; Tricaprin; Tricaprylin; Trichodesma Zeylanicum Oil; Trierucin; Triheptanoin; Triheptylundecanoin; Trihydroxymethoxystearin; Trihydroxystearin; Triisononanoin; Triisopalmitin; Triisostearin; Trilaurin; Trilinolein; Trilinolenin; Trimyristin; Trioctanoin; Triolein; Tripalmitin; Tripalmitolein; Triricinolein; Trisebacin; Tristearin; Triundecanoin; Tuna Oil; Vegetable Oil; Walnut (*Juglans Regia*) Oil; Wheat Bran Lipids; and Wheat (*Triticum Vulgare*) Germ Oil. In some preferred embodiments, the natural oil product is one or more of soybean oil, hydrogenated soybean oil, coconut oil, rapeseed oil, high oleic acid sunflower oil or olive oil. The biorenewable processing aids do not include, and thus compositions of the present invention are free of epoxidized processing aids or oils, such as epoxidized soybean oil. The biorenewable processing aids of the present invention may be (preferred) partially or fully hydrogenated.

The amount of biorenewable processing aids present in the thermoplastic elastomer compositions of the present invention can vary depending upon the types of polymers utilized and end products desired to be formed with the compositions. That said, in one embodiment, the amount of biorenewable processing aids utilized in the thermoplastic elastomer compositions ranges generally from about 1 to about 100 parts, desirably from about 2 to about 75 parts, and preferably from about 5 or to about 60 parts by weight based on 100 parts by weight of total styrenic block copolymer.

Isobutylene-Containing (Co)Polymers

The sealing element compositions of the present invention include a polymer or copolymer derived at least from isobutylene monomers. (Co)polymers containing relatively high isobutylene content have low inherent oxygen permeability.

In one embodiment, the isobutylene-containing (co)polymer comprises butyl rubber which is a copolymer of predominantly isobutylene with small amounts of diene monomers, generally isoprene, that provides sufficient unsaturation to allow the butyl to be crosslinked. Butyl rubber as defined herein comprises from about 80 to about 99 weight percent repeat units from isobutylene and from about 1 to about 20 weight percent repeat units from a conjugated diene having from 4 to 10 carbon atoms. Preferably the butyl rubber contains from about 1 to about 5 weight percent units derived from the conjugated diene. Butyl rubber is commercially available from many sources including Lanxess as Butyl RB 101-3 and Butyl RB 402.

Polyisobutylene or PIB or polyisobutene is a homopolymer of isobutylene. The polyisobutylene can include relatively minor amounts of non-isobutylene monomers that are present as impurities.

The isobutylene containing polymers of the invention have a relatively high molecular weight, generally a number average molecular weight of greater than 6,000 g/mol, desirably greater than 10,000 g/mol, preferably greater than 20,000 g/mol or 35,000 g/mol, measured as described above with respect to the styrenic block copolymer. PIB has a densely packed structure with specific gravity of 0.92. This dense packing along with large backbone-bond rotation barrier is responsible for sluggish mobility and excellent barrier properties of isobutylene containing copolymers. In addition to low permeability, PIB and its copolymers have good aging performance, ozone, and flex resistance. They also have a broad vibration damping response, see Concise Polymeric Materials Encyclopaedia, Joseph C. Salamone (Ed,) pages 722-723.

The amount of the isobutylene-containing (co)polymer(s) utilized in the sealing element compositions of the present invention ranges generally from about 1 to about 200 parts, desirably from about 10 to about 180 parts and preferably from about 20 to about 150 parts by weight based on 100 parts by weight of the total styrenic block copolymer.

Additives

The compositions of the present invention may include additional additives including, but not limited to lubricants, light stabilizers, antioxidant, flame retardant additives, pigments, peroxides, heat stabilizers, processing aids, mold release agents, flow enhancing agents, nanoparticles, foam agents, oxygen scavenger, acid scavenger, platelet fillers and non-platelet fillers. Examples of fillers for use in the compositions include, but are not limited to, one or more of calcium carbonate, talc, clay, zeolite, silica, titanium dioxide, carbon black, barium sulfate, mica, glass fibers, whiskers, carbon fibers, magnesium carbonate, glass powders, metal powders, kaolin, graphite, and molybdenum disulfide. Suitable fillers include bio-based fillers, e.g. various fibers, cellulose, and/or lignin.

Permeability measurements are performed on a 1 mm thick film in a Mocon Ox-tran 2/61 instrument. The compositions of the present invention have oxygen permeability of less than 1200 cc-mil/100 in$^2$·day·atm at 23° C. and 90% relative humidity.

Examples

The examples set forth below serve to illustrate the benefits of the compositions of the present invention, and are not intended to limit the scope of the invention.

The examples set forth in the following tables were prepared by dry blending all the ingredients before mixing them in a laboratory Banbury mixer under high speed and high steam conditions using a drop temperature of 330° F. The mixing time of the compound in the Banbury was approximately 5 minutes. These compounds can also be prepared using a twin screw extrusion process. The mixed compounds from the Banbury were later diced and injection molded to produce plaques for property analysis.

The following raw materials were utilized for the examples:

| | |
|---|---|
| SBC | Septon 4055 from Kuraray |
| AO | Irganox 1010 from BASF |
| PP | Braskem F008F |
| PIB | Oppanol B30 SF |
| HSO | Hydrogenated Soybean Oil |

Samples from the Banbury were injection molded at 170° C.-200° C. into plaques approximately 2 mm thick, 6.0 cm wide by 8.75 cm long. The shear viscosity measurements were performed on diced compounds at 200° C. using a die with L|D ratio of 30:1.

The following test protocols were used for testing:

| Tests | Units | Procedure |
|---|---|---|
| Hardness (Inst./5 sec) | Shore A | ASTM D-2240 |
| Tensile Strength | Psi | ASTM D-412 |
| Tensile Elongation | % | ASTM D-412 |
| Compression Set, Time (hrs) @ temperature (° C.) | % | ASTM D-395 |
| Oxygen Permeability 23° C./ 90% RH | cc · mil/100 in$^2$ · day · atm | ASTM D-3985 |
| Shear Viscosity | Pa · s | ASTM D-3835 |
| Specific Gravity | | ASTM D-792 |

Tapes were extruded using a ¾" lab extruder equipped with a 1" slit die. The extrusion was carried out at 385° F.-410° F. at screw speed of 60 rpm. The tape quality was evaluated visually post-extrusion.

TABLE 1

| | | Experiment Number | | |
|---|---|---|---|---|
| | | Comparative #1 | Comparative #2 | Example #1 |
| SBC | | 100.00 | 100.00 | 100.00 |
| PP | | 45.00 | 45.000 | 45.00 |
| Mineral oil | | — | 27.28 | — |
| PIB | | 100.00 | 100.00 | 100.00 |
| AO | | .55 | .55 | .55 |
| HSO | | — | — | 27.28 |
| Total (Wt.) | | 245.55 | 272.83 | 272.83 |
| Specific Gravity | | 0.91 | 0.9 | 0.91 |
| Shore A Hardness (Inst) | A | 76 | 69 | 79 |
| Shore A hardness (5-s) | A | 73 | 65 | 76 |
| Tensile Strength | Psi | 742 | 571 | 701 |
| Tensile Elongation | % | 633 | 583 | 614 |
| Compression Set (70° C./22 hrs) | % | 59.6 | 55 | 57.5 |
| Oxygen Permeability, 23° C./90% RH cc · mil/100 in$^2$ · day | | 469 | 839 | 422 |
| Shear Viscosity (200° C., L/D = 30) 232 s$^{-1}$ | Pa · s | 1040 | 720 | 731 |

As apparent from Table 1, the reduction in oxygen permeability utilizing the biorenewable processing aid HSO was over 10% vs. Comparative #1 and about 50% vs. Comparative #2. The reduction of viscosity was 30% when comparing Example #1 to Comparative #1.

TABLE 2

| | | Experiment Number | |
|---|---|---|---|
| | | Comparative #1A | Example #1A |
| SBC | | 100.00 | 100.00 |
| PP | | 45.00 | 45.00 |
| PIB | | 100 | 100 |
| AO | | 0.55 | 0.55 |
| HSO | | — | 27.28 |
| Total (Wt.) | | 245.55 | 272.83 |
| Specifiv Gravity | | 0.91 | 0.91 |
| Shore A Hardness (Inst) | A | 76 | 80 |
| Shore A hardness (5-s) | A | 72 | 76 |
| Tensile Strength | Psi | 731 | 712 |
| Tensile Elongation | % | 596 | 630 |
| Compression Set (70° C./22 hrs) | % | 60 | 57 |
| Oxygen Permeability, 23° C./90% RH (cc · mil/100 in$^2$ · day · atm) | | 472 | 426 |
| Shear Viscosity (200° C., L/D = 30) 232 s$^{-1}$ | Pa · s | 1075 | 731 |

Table 2 shows effect of biorenewable processing aid, namely HSO, addition on properties of SBC/PIB compounds and relates to a separate repeated preparation of Comparative #1 and Example #1 set forth in Table 1. The reduction in oxygen permeability was 10% and the reduction in shear viscosity was 32%.

TABLE 3

Comparison between Different Processing Aids

| | | Comparative #1A | Comparative #3 | Comparative #4 | Comparative #5 | Example #1A |
|---|---|---|---|---|---|---|
| SBC | | 100.00 | 100.00 | 100.00 | 100.00 | 100.00 |
| PP | | 45.00 | 45.000 | 45.00 | 45.00 | 45.00 |
| PIB | | 100 | 100 | 100 | 100 | 100 |
| AO | | 0.55 | 0.55 | 0.55 | 0.55 | 0.55 |
| ESO | | — | 27.28 | — | — | — |
| Mineral oil | | — | — | 27.28 | — | — |
| Paraffin wax | | — | — | — | 27.28 | — |
| HSO | | — | — | — | — | 27.28 |
| Total (Wt.) | | 245.55 | 272.83 | 272.83 | 272.83 | 272.83 |
| Specifiv Gravity | | 0.91 | 0.92 | 0.9 | 0.91 | 0.91 |
| Shore A Hardness (Inst) | A | 76 | 69 | 68 | 76 | 80 |
| Shore A hardness (5-s) | A | 72 | 64 | 64 | 72 | 76 |
| Tensile Strength | Psi | 731 | 634 | 560 | 613 | 712 |
| Tensile Elongation | % | 596 | 549 | 562 | 590 | 630 |
| Compression Set (70° C./22 hrs) | % | 60 | 67 | 55 | 57 | 57 |
| Oxygen Permeability, 23° C./90% RH (cc · mil/100 in² · day · atm) | | 472 | 596 | 793 | 565 | 426 |
| Permeability Percent increase vs. HSO | | 10% | 29% | 46% | 25% | — |
| Shear Viscosity (200° C., L/D = 30) 232 s⁻¹ | Pa · s | 1075 | 674 | 727 | 666 | 731 |

Table 3 relates to the utilization of different processing aids, i.e., Comparative #3 utilized epoxidized soybean oil (ESO), Comparative #4 utilized mineral oil, and Comparative #5 utilized paraffin wax, whereas #1A utilized HSO. The reduction with respect to oxygen permeability by utilizing HSO was significant. The most unexpected result was 25% with the use of paraffin wax as compared to HSO. Both have similar molecular weights, about 900, and similar melting points (63° C. for paraffin wax and 70° C. for HSO) and both are crystalline. Yet, Example #1A with HSO unexpectedly had a 25% lower oxygen permeability than Comparative #5 including paraffin wax.

In view of the fact that the comparative compositions including ESO, mineral oil, and paraffin wax had much higher (poor) oxygen permeability values, these compounds are not part of the present invention. That is, the sealing element compositions of the present invention are generally free of ESO, mineral oil, and paraffin wax in one embodiment. That is, compositions of the invention contain less than about 0.5% by weight, desirably less than 0.1% by weight, and preferably nil, that is no measurable ESO, mineral oil or paraffin wax by weight per 100 parts by weight of the total amount of the one or more styrenic block copolymers in some embodiments. Hence, HSO is a much better processing aid since it is not only effective in reducing the viscosity, but also helps improve barrier performance.

TABLE 4

Effect of Biorenewable Processing Aid on Butyl Rubber/SBC Compounds

| | | Comparative #6 | Example #2 |
|---|---|---|---|
| SBC | | 100.00 | 100.00 |
| PP | | 45.00 | 45.000 |
| Butyl rubber | | 100 | 100 |
| AO | | 0.55 | 0.55 |
| HSO | | — | 27.28 |
| Total (Wt.) | | 245.55 | 272.83 |
| Extrudability of tapes | | Edge tear seen | Significantly reduced edge tear |
| Specifiv Gravity | | 0.91 | 0.91 |
| Shore A Hardness (Inst) | A | 72 | 78 |
| Shore A hardness (5-s) | A | 67 | 73 |
| Tensile Strength | Psi | 582 | 572 |
| Tensile Elongation | % | 630 | 643 |
| Compression Set (70° C./22 hrs) | % | 81 | 76 |
| Oxygen Permeability, 23° C./90% RH (cc · mil/100 in² · day · atm) | | 562 | 429 |
| Shear Viscosity (200° C., L/D = 30) 232 s⁻¹ | Pa · s | 937 | 679 |

As apparent from Table 4, significant reductions with respect to oxygen permeability, i.e. 24%, and shear viscosity, i.e. 28%, were obtained utilizing a biorenewable processing aid, HSO, in a composition including SBC and butyl rubber.

The examples above indicate the effect of a biorenewable processing acid, in particular hydrogenated soybean oil, on the properties of SBC/PIB compounds. Addition of biorenewable processing aid reduces the viscosity of the SBC/PIB compound and makes it easier to process. While most processing aids such as mineral oil worsen the barrier performance of the compound as shown in Comparative #2, the biorenewable processing aid not only provides comparable viscosity reduction but also improves the barrier performance significantly. Hence, it acts as a barrier synergist along with the PIB and/or butyl rubber. The biorenewable processing aid improves the barrier performance and reduces viscosity while maintaining other properties.

While in accordance with the patent statutes the best mode and preferred embodiment have been set forth, the scope of the invention is not limited thereto, but rather by the scope of the attached claims.

What is claimed is:

1. A sealing element composition, comprising:
  a block copolymer having at least one hard block (A) including aromatic vinyl repeat units and at least one soft polymer block (B) including two or more repeat units, that are the same or different, independently derived from one or more of an olefin monomer and a diene monomer;
  a polyolefin;
  an isobutylene-containing (co)polymer having a number average molecular weight of greater than 6,000 g/mol, wherein the isobutylene-containing (co)polymer is a i) homopolymer, ii) copolymer consisting essentially of from about 80 to about 99 weight percent of repeat units derived from isobutylene and from about 1 to about 20 weight percent of repeat units derived from a conjugated diene having from 4 to 10 carbon atoms, or iii) a combination thereof; and
  a processing aid having an ester group, wherein the composition is free of epoxidized processing aids and epoxidized processing oil, and wherein the composition has an oxygen permeability of less than 1200 cc-mil/100 in$^2$·day·atm at 23° C. and 90% relative humidity.

2. The sealing element composition of claim 1, wherein the amount of said polyolefin is from about 1 to about 200 parts by weight per 100 parts by weight of said block copolymer, and wherein the amount of said isobutylene-containing (co)polymer is from about 1 to about 200 parts by weight per 100 parts by weight of said styrene block copolymer, and wherein the amount of said processing aid is from about 1 to about 100 parts by weight per 100 parts by weight of said block copolymer.

3. The sealing element composition of claim 2, wherein said polyolefin polymer is derived from two or more same or different monoolefins having from 2 to about 12 carbon atoms.

4. The sealing element composition of claim 3, wherein said isobutylene-containing (co)polymer has a number average molecular weight of greater than 10,000 g/mol.

5. The sealing element composition of claim 4, wherein said biorenewable processing aid has a crystalline melting range of from about 30° C. to about 80° C.

6. The sealing element composition of claim 5, wherein the amount of said polyolefin is from about 10 to about 170 parts by weight per 100 parts by weight of said block copolymer, wherein the amount of said isobutylene-containing (co)polymer is from about 10 to about 180 parts by weight per 100 parts by weight of said block copolymer; wherein the amount of the processing aid is from about 2 to about 75 parts by weight per 100 parts by weight of said block copolymer; and wherein said sealing element composition is free of mineral oil and paraffin wax.

7. The sealing element composition of claim 6, wherein said block copolymer comprises styrene-butadiene-styrene, styrene-butadiene/butylene-styrene, styrene-isoprene-styrene, styrene-ethylene/propylene-styrene, styrene-ethylene/propylene, styrene-ethylene/butylene-styrene, styrene-ethylene/ethylene/propylene-styrene or styrene-isobutylene-styrene, or any combination thereof; and wherein said isobutylene-containing (co)polymer has a number average molecular weight of greater than 20,000 g/mol.

8. The sealing element composition of claim 7, wherein said polyolefin comprises polyethylene, polypropylene, or EVA, or any combination thereof.

9. The sealing element composition of claim 7, wherein the amount of said polyolefin is from about 20 to about 150 parts by weight per 100 parts by weight of said block copolymer, wherein the amount of said isobutylene-containing (co)polymer is from about 20 to about 150 parts by weight per 100 parts by weight of said block copolymer; wherein the amount of said processing aid is from about 5 to about 60 parts by weight per 100 parts by weight of said block copolymer, and wherein said processing aid comprises soybean oil, hydrogenated soybean oil, coconut oil, rapeseed oil, high oleic acid sunflower oil, high oleic olive oil, or any combination thereof.

10. The sealing element composition of claim 1, wherein said processing aid comprises soybean oil, hydrogenated soybean oil, coconut oil, rapeseed oil, high oleic acid sunflower oil, high oleic olive oil, or any combination thereof, and wherein the isobutylene-containing (co)polymer is a homopolymer of isobutylene and is present in an amount from about 10 to about 180 parts based upon 100 total parts by weight of the block copolymer.

11. The sealing element composition of claim 10, wherein said block copolymer comprises styrene-butadiene-styrene, styrene-butadiene/butylene-styrene, styrene-isoprene-styrene, styrene-ethylene/propylene-styrene, styrene-ethylene/propylene, styrene-ethylene/butylene-styrene, styrene-ethylene/ethylene/propylene-styrene or styrene-isobutylene-styrene, or any combination thereof; and wherein the amount of said polyolefin is from about 10 to about 170 parts by weight per 100 parts by weight of said block copolymer, and wherein the amount of the processing aid is from about 2 to about 75 parts by weight per 100 parts by weight of said block copolymer.

12. The sealing element composition of claim 11, wherein the amount of said polyolefin is from about 20 to about 150 parts by weight per 100 parts by weight of said block copolymer, and wherein the amount of said processing aid is from about 5 to about 60 parts by weight per 100 parts by weight of said block copolymer.

13. The sealing element composition of claim 12, wherein said sealing element composition is free of mineral oil and paraffin wax.

14. The sealing element composition of claim 1, wherein said processing aid comprises soybean oil, hydrogenated soybean oil, coconut oil, rapeseed oil, high oleic acid sunflower oil, high oleic olive oil, or any combination thereof, and wherein the isobutylene-containing (co)polymer is butyl rubber and is present in an amount from about 10 to about 180 parts based upon 100 total parts by weight of the block copolymer.

15. The sealing element composition of claim 14, wherein said block copolymer comprises styrene-butadiene-styrene, styrene-butadiene/butylene-styrene, styrene-isoprene-styrene, styrene-ethylene/propylene-styrene, styrene-ethylene/propylene, styrene-ethylene/butylene-styrene, styrene-ethylene/ethylene/propylene-styrene or styrene-isobutylene-styrene, or any combination thereof; and wherein the amount of said polyolefin is from about 10 to about 170 parts by weight per 100 parts by weight of said block copolymer, and wherein the amount of the processing aid is from about 2 to about 75 parts by weight per 100 parts by weight of said block copolymer.

16. The sealing element composition of claim 15, wherein the amount of said polyolefin is from about 20 to about 150 parts by weight per 100 parts by weight of said block copolymer, and wherein the amount of said processing aid is from about 5 to about 60 parts by weight per 100 parts by weight of said block copolymer.

17. A sealing element formed from the composition of claim 1.

18. A sealing element formed from the composition of claim 5.

19. A sealing element formed from the composition of claim 7.

20. The sealing element composition according to claim 1, wherein the processing aid is hydrogenated.

21. The sealing element composition according to claim 5, wherein the processing aid is hydrogenated.

* * * * *